March 25, 1924.

W. L. WALTON

POTATO CUTTING MACHINE

Filed April 18, 1921      4 Sheets-Sheet 1

1,487,905

INVENTOR
W. L. Walton
BY
Munn & Co
ATTORNEYS

March 25, 1924.

W. L. WALTON

POTATO CUTTING MACHINE

Filed April 18, 1921 4 Sheets-Sheet 4

1,487,905

INVENTOR
W. L. Walton
BY
ATTORNEYS

Patented Mar. 25, 1924.

1,487,905

UNITED STATES PATENT OFFICE.

WILLIAM L. WALTON, OF BANTRY, NORTH DAKOTA.

POTATO-CUTTING MACHINE.

Application filed April 18, 1921. Serial No. 462,144.

*To all whom it may concern:*

Be it known that I, WILLIAM L. WALTON, a citizen of the United States, and a resident of Bantry, in the county of McHenry and State of North Dakota, have invented a new and useful Improvement in Potato-Cutting Machines, of which the following is a full, clear, and exact description.

My invention relates to improvements in potato cutting machines, and it consists in the combinations, constructions and arrangements herein described and claimed.

An object of my invention is to provide a potato cutting machine which will automatically cut a potato into two, four, six, eight or twelve practically equal parts.

A further object of my invention is to provide a device of the type described in which the entire potato is cut up into a plurality of equal parts, there being no waste pieces cut off during the operation.

A further object of my invention is to provide a device of the type described in which the cutting knives can be readily changed so as to cut the potato into as many equal parts as desired.

A further object of my invention is to provide a device of the type described in which the cutting knives are automatically positioned with respect to the potato to be cut, so that the potato will be cut into the desired number of equal parts with a single operation.

A further object of my invention is to provide a device of the type described having a novel means for automatically centering the potato with respect to the cutting knives, whereby the potato is cut into a plurality of equal parts.

A further object of my invention is to provide a device of the type described having means by which the number of cutting knives can be instantly changed so as to divide the potato into four and eight equal parts or into six and twelve equal parts.

Other objects and advantages will appear in the following specification, and the novel features of the invention will be particularly pointed out in the appended claims.

My invention is illustrated in the accompanying drawings forming part of this application, in which—

In carrying out my invention, I provide a frame comprising two vertically extending end supports 1 and 2 of the shape shown in the drawings, which are mounted on legs 3 and 4. On the upper ends of the supports 1 and 2 are secured by any suitable means, such as by bolts 5, brackets 6 and 7, to which in turn are secured by bolts or rivets 8, two parallel members 9 and 10. Supported by the members 9 and 10 are three brackets 11, 12 and 13, and four vertically disposed guide plates 14, 15, 16 and 17 (see Figures 1, 2, 4 and 5). The guide plates 14, 15, 16 and 17 are mounted between the arms of the bracket 12 and the members 9 and 10 are secured in place by means of the rivets 8. It will also be seen that the plates 14 and 15 and the plates 16 and 17 are spaced from each other and extend to the base where they are held in spaced apart relation by means of member 18.

Positioned above the parallel members 9 and 10 and carried thereby is a potato holding and centering device which comprises two vertically movable parallel jaws 19 and 20 substantially V-shaped in cross section, as is clearly shown in Figures 1, 2, 3, 4 and 5. The jaws 19 and 20 are secured to vertical plates 21 and 22 which are slidably mounted between the guide plates 14 and 15, an arm of the bracket 12 and the member 9 at their upper ends, and between plates 23 at their lower ends, the plates 23 being secured to the members 14 and 15 in any suitable manner. An equalizing lever 24 pivotally mounted at its center to the arm of the bracket 12 is connected by rods 25 and 26 to the plates 21 and 22 respectively. With this construction it will be apparent that the two jaws 19 and 20 will move at the same speed and will always be equi-distant from a common center.

A potato moving plunger has the axis of its shaft 27 coinciding with the "common center" line of the jaws 19 and 20. With this construction, any sized potato when gripped by the jaws 19 and 20 is automatically centered with respect to the axis of the plunger shaft 27. As will be seen in Figure 1, the shaft 27 is slidably disposed in upstanding portions of the brackets 7 and 13 and carries on its inner end a plunger-head 28 which has a substantially diamond-shaped face with an extended section running downward therefrom to approximately the level of the top of the knife 66, which extension serves the purpose of guiding and supporting one end of the potato as it is carried downward through the knives 66, 84—84 and 85—85, the diamond-shaped portion of said face being adapted to be received between the jaws 19 and 20 even when the latter are brought together.

The jaws 19 and 20 are prevented from actually engaging each other when moved into closed position by means of a rod 29 connecting the lever 24 with a second lever 30 pivotally carried by the bracket 13. A stop pin 31 is also carried by the bracket 13, and stops the lever 30 when swung a predetermined distance, thus preventing the jaws 19 and 20 from engaging each other.

The plunger shaft 27 is actuated by a lever 32 and a pitman 33, the latter is pivotally secured to the lever 32 and to a crank shaft 34. The crank shaft carries a pulley 35 around which a belt 36 is placed and which in turn is connected to some outside source of power (not shown). The shaft 27 is therefore reciprocated when the crank shaft 34 is rotated. This is accomplished by means of the pitman 33 and the lever 32, the lever being connected at one end to the support 2 by a link 36' and at its other end to a collar 37 carried by the shaft 27.

The potato, after being centered between the jaws 19 and 20, is moved therebetween by the plunger head 28 which has a knife shaped projection 39 adapted to impale the potato thereon, thereby preventing any lateral movement of the latter. Before the potato leaves the jaws 19 and 20, it is forced against a second plunger-head 40 carried by a shaft 41 coaxially alined with the shaft 27. This shaft (see Figure 1) is slidably mounted between upstanding portions of the brackets 6 and 11 and has rigidly secured thereto a collar 42 which in turn is connected by a link 43 to the free end of a spring actuated lever 44 pivoted at 45 to the bracket 6. As the potato is moved by the plunger-head 28, it first abuts against the plunger-head 40 and moves the latter against the tension of the spring 46 secured to the lever 44 and the bracket 11. The plunger-head 40 is also provided with a knife 47 similar to the knives 38 and 39 and is adapted to impale the end of the potato adjacent thereto and thus hold it from any lateral movement.

Figure 1:
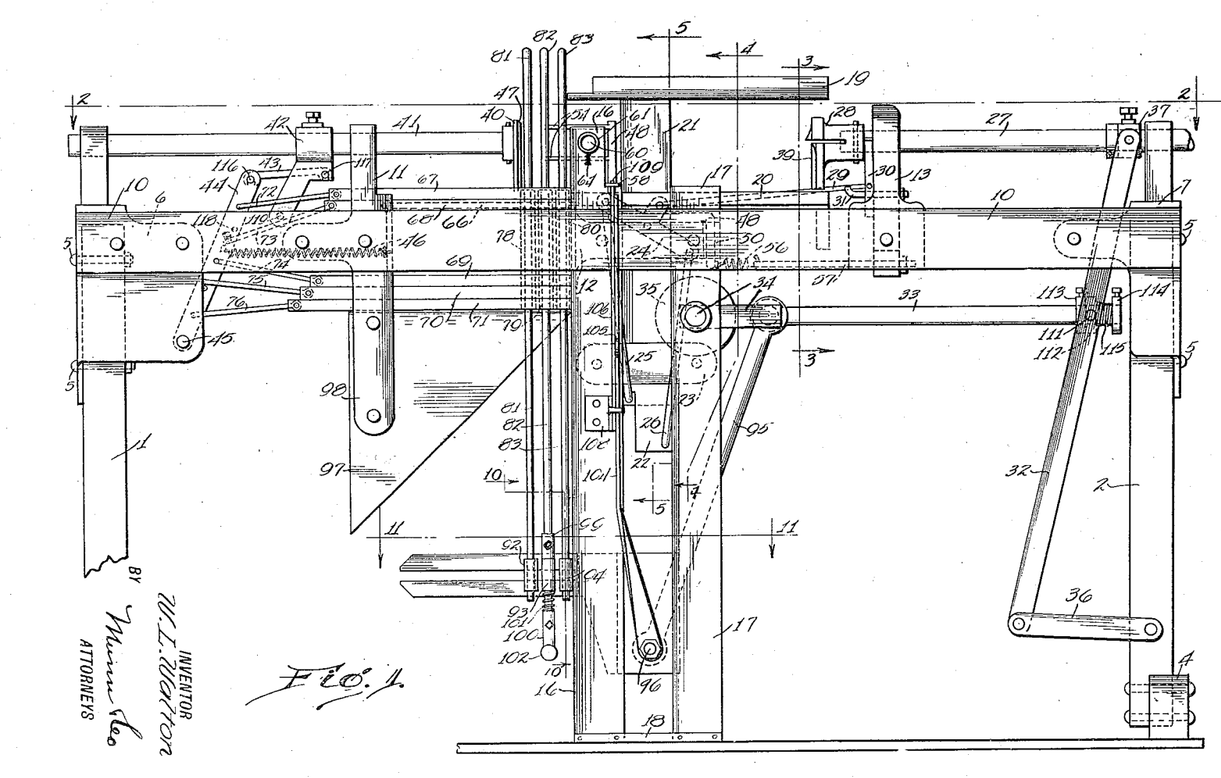
Figure 1 is a side elevation of the device.
Figures 2, 3, 4, 5:
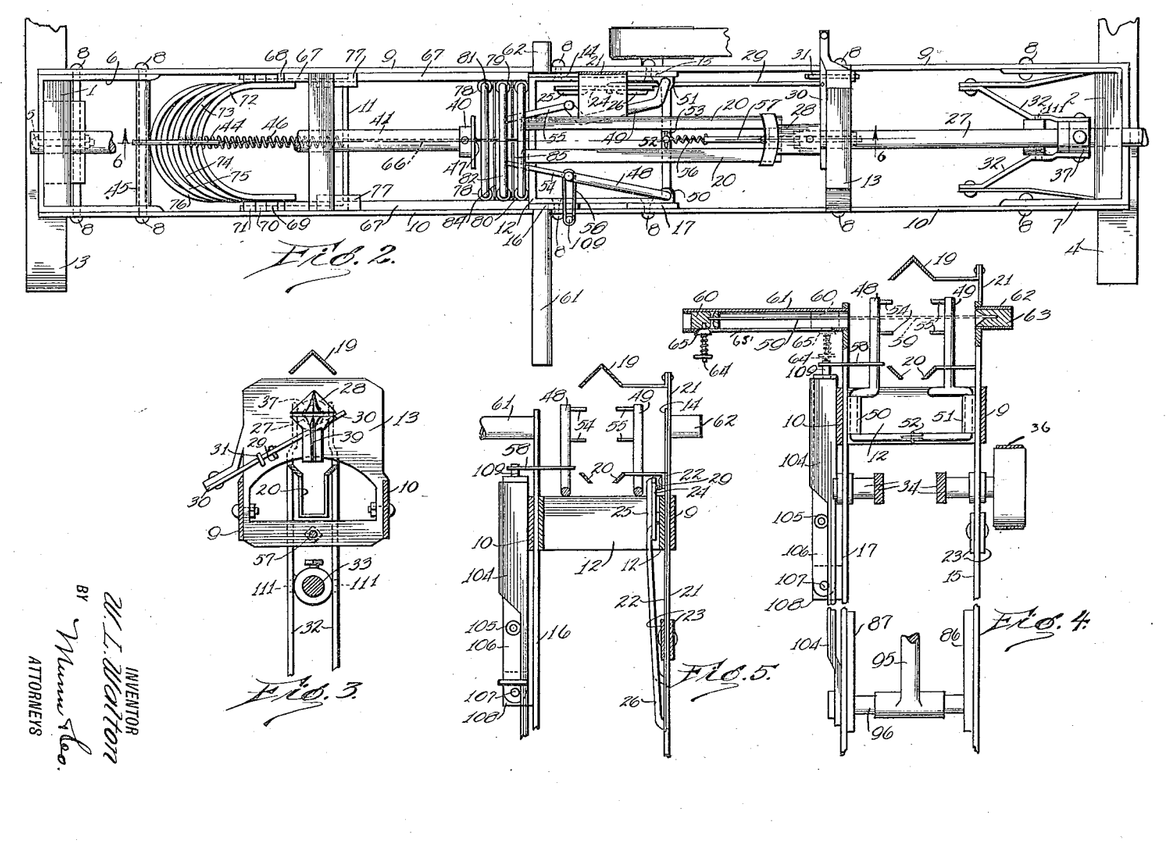
Figure 2 is a section along the line 2—2 of Figure 1.
Figure 3 is a section along the line 3—3 of Figure 1.
Figure 4 is a section along the line 4—4 of Figure 1.
Figure 5 is a section along the line 5—5 of Figure 1.

As a further means of guiding the potato and preventing any lateral movement thereof while it is being moved away from the jaws 19 and 20, I provide two arms 48 and 49 carried in vertically disposed bearings 50 and 51 formed in the ends of the arms of the bracket 12 (see Figures 2 and 4). The lower ends of the arms extend transversely across the machine at right angles to the parallel side members 9 and 10, and are hinged together by a pin 52. It will be seen that the pin slides in a slot 53 in the arm 48, thereby preventing any buckling of the two arms as they are swung in their bearings. The arms 48 and 49 are again horizontally bent above the bearings 50 and 51 and taper slightly toward each other (see Figure 2). Adjacent the end of the bracket 12 the arms 48 and 49 are bent upwardly and each carry two transverse fingers 54—54 and 55—55 respectively, which are adapted to engage opposite sides of the potato as the latter passes therebetween. It is obvious since the arms 48 and 49 are pivoted to each other at 50, they will always remain equi-distant from a common center when they are moved. A spring 56 connected to the pin 52 and to a rod 57 carried by the bracket 13 normally keeps the arms 48 and 49 in closed position. The arms are prevented from engaging each other by a link 58 which will be hereafter described.

The potato, upon leaving the jaws 19 and 20, can be cut horizontally into two equal halves by a horizontally disposed knife 59 which has its holder 60 slidably disposed in a tube 61 carried at the upper end of the guide plate 16. A tube 62 similar in diameter but shorter in length is co-axially alined with the tube 61 and is carried by the guide plate 14 at the upper end thereof. The knife 59 can be moved so as to project across the machine as shown in the dotted line position in Figure 4 where the free end thereof is held in the guide block 63. The knife is also held from rotation by a pin 64 carried by the holder 60 and which projects through a slot 65' in the tube 61. A spring-pressed plunger 65 slidably mounted on the pin 64 frictionally engages the tube 61 and holds the knife in operative or inoperative position.

It will be seen that if the knife 59 is in operative position the potato will be cut as it is moved thereagainst by the plunger-head 28, and this cutting operation takes place before the free end of the potato abuts against the plunger-head 40.

As the potato is being moved out of engagement with the jaws 19 and 20, it is carried above a horizontally disposed knife 66 which is adapted to cut the potato vertically when the latter is moved downwardly by a means to be hereafter described.

The knife is positioned between the brackets 11 and 12 just below the potato that is moved thereover and is removably held therebetween.

Some potatoes are large enough to be divided into six or twelve equal parts. To this end I provide a plurality of pairs of parallel horizontally disposed bars 67, 68, 69, 70 and 71 having their ends connected to the lever 44 by means of U-shaped members 72, 73, 74, 75 and 76 and which are slidably disposed in bearings 77 carried by the bracket 11. The pairs of parallel bars 67, 69 and 71 carry sleeves 78, 79 and 80 in which are slidably disposed U-shaped members 81, 82, and 83, while the pairs of parallel bars 68 and 70 carry cutting knives 84—84 and 85—85 of the shapes shown in the drawings (see Figure 8). As the shaft 41 is moved, the lever 44 will be swung about its pivot 45, and carry therewith the parallel bars 67, 68, 69, 70 and 71 which in turn, position the cutting knives 84 and 85 beneath the potato so the latter will be cut thereby when it is carried downwardly by the U-shaped members 81, 82 and 83. To effect this movement two parallel plates 86 and 87 are slidably disposed in the guide plates 14, 15, 16 and 17 respectively (see Figures 1, 6, and 11). Each of the plates 86 and 87 has a slot 88 in which is slidably carried rods 89, 90 and 91 which are in turn connected to the depending arms of the U-shaped members 81, 82 and 83 by means of T's 92—92, 93—93 and 94—94. A reciprocating movement is imparted to the plates 86 and 87 by means of a pitman 95 connected to the crank shaft 34 and to a stub shaft 96 carried by the plates, whereby the U-shaped members 81, 82 and 83 are also reciprocating and, as will be seen, on their downward stroke force the potato through the knives 66, 84—84 and 85—85. The U-shaped members 81, 82 and 83 will always be actuated by the plates 86 and 87 no matter in what position they are moved into by the lever 44, since their rods 89, 90 and 91 freely slide in the slots 88.

From the foregoing description of the various parts of the device, the operation thereof may be readily understood. To cut a potato into twelve equal parts, all of the cutting knives are used and the potato is first cut horizontally into halves by the knife 59 as it leaves the jaws 19 and 20, and then each half is cut into sixths as the potato is forced through the knives 66, 84—84 and 85—85. The twelve cut pieces thereupon drop into a conveyor 97 carried by the depending arms 98 of the bracket 11 and are conveyed to any receptacle (not shown).

It will be obvious that when the device is cutting a potato into twelve parts, the U-shaped member 82 would strike the potato before the U-shaped members 81 and 83 would strike it. This would likely result in one end of the potato slipping downward before the other end, thus getting it out of position for proper division, since the potato would be carried downwardly by only the member 82 instead of by all three members. To obviate this, I loosely mount the T's 93—93 on the arms of the member 82 and dispose them between collars 99—99 and 100—100, the T's 93—93 being resiliently supported by springs 101—101. The collars 100—100 rotatably carry a rod 102 which in turn carries fingers 103—103 which are adapted to engage the T's 93—93 and hold them rigidly against the collars 99—99. The member 82 will operate in identically the same manner as the members 81 and 83. If, however, the rod 102 is rotated so as to disengage the fingers 103 from the T's 93—93, the U-shaped member 82 which is carried downwardly by the plates 86 and 87 will first strike the potato, but instead of carrying the potato through the knives will rest on the top thereof until the members 81 and 83 engage therewith, the lost movement being taken up by the springs 101. As soon as all three members engage the potato, the latter is carried through the knives.

Figures 6, 7, 8:
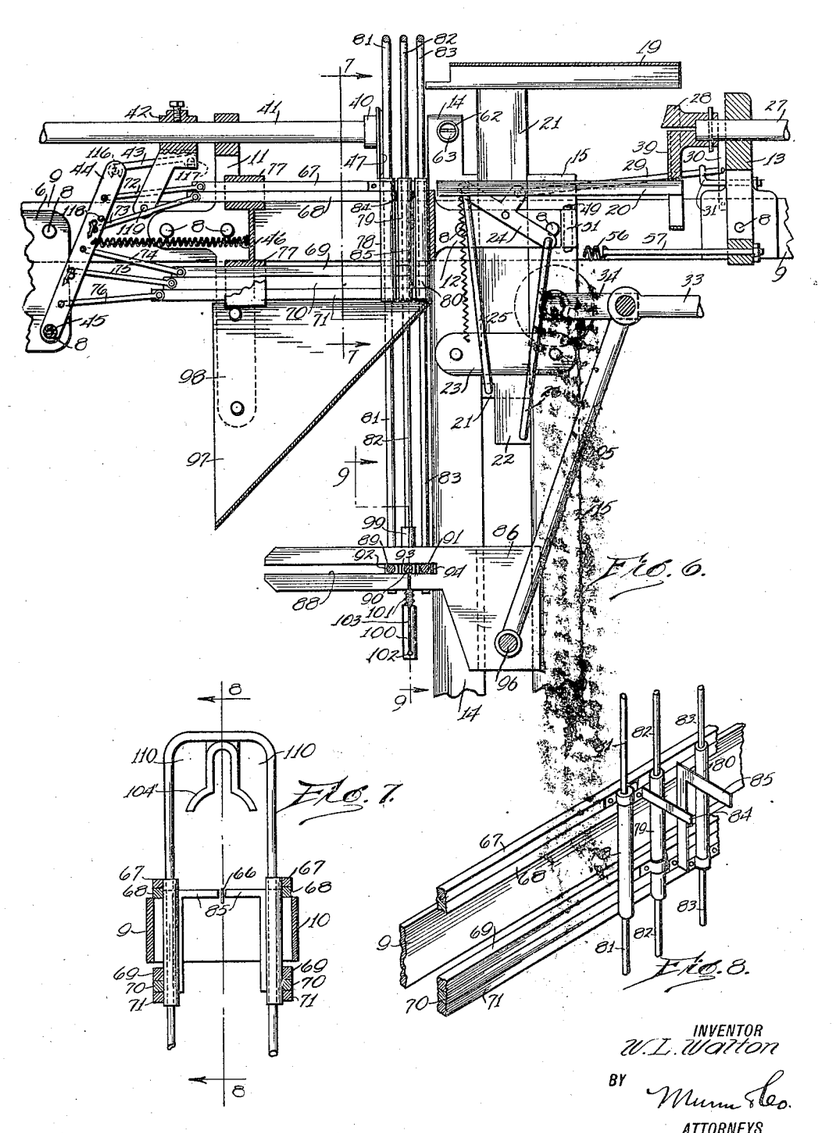
Figure 6 is a section along the line 6—6 of Figure 2.
Figure 7 is a section along the line 7—7 of Figure 6.
Figure 8 is a section along the line 8—8 of Figure 7.
Figure 9:
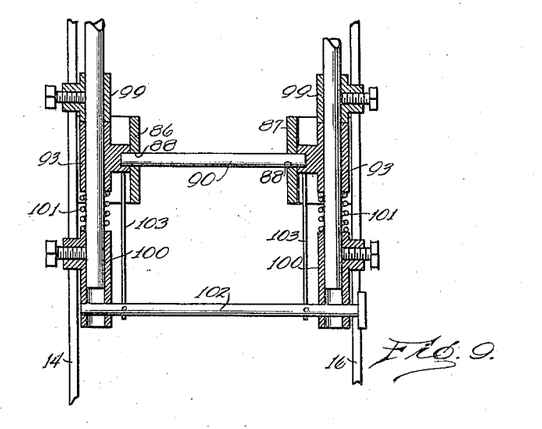
Figure 9 is a section along the line 9—9 of Figure 6.

It will also be observed that the U-shaped member 83 will engage the fingers 54—54 and 55—55 when it is at the lowermost point of its stroke if some means is not provided for swinging the arms 48 and 49 outwardly, thereby allowing the fingers to pass on each side of the potato engaging yoke 104' (see Figure 7). This means comprises a vertically disposed and slidable cam-shaped member 104 (see Figures 1, 2, 4 and 5) pivotally secured to the stub shaft 96 and adapted to engage and to swing outwardly a roller 105 carried by a lever 106 which is pivoted at 107 to a lug 108 carried by the guide plate 16, whereby the lever 106 is swung outwardly about its pivot on every down stroke of the plates 86 and 87. A pin 109 is carried by the lever 106 and at the upper end thereof and is connected by the link 58 to the arm 48. As the U-shaped member 83 is carried downwardly, the fingers 54 and 55 are swung outwardly and pass into the recesses 110 formed between the member 104' and the U-shaped member 83 (see Figure 7).

If the pivot pin 111 on which the lever 32 is secured was rigidly mounted to the pitman 33, the shaft 27, on reaching the innermost point of its stroke, would immediately start on its return stroke. With the plunger-shaft 27 operating in this manner, a sufficient amount of time would not elapse in order to allow the U-shaped members 81, 82 and 83 to carry the potato through the knives before the shaft 27 would start on its return stroke. To this end, I slidably mount a collar 112, which carries the pins 111, between two collars 113 and 114 rigidly secured to the pitman 33. Between the collars 112 and 114 I dispose a spring 115, whereby the shafts 27 and 41 will remain stationary during a part of their stroke while the lost motion is taken up by the spring 115, thus giving ample time for the U-shaped members to carry the potato through the knives and before the shafts 27 and 41 start on their return stroke.

When a potato is to be cut into eight parts, the link 43 is removed from the trunnions 116 and 117 and placed on the trunnions 118 and 119. This swings the lever 44 into such a position that the cutting knife 84 is always positioned directly under the plunger-head 40 during the entire movement of the latter, and only permits the knives 66 and 85—85 to cut the potato. During this operation, only the U-shaped members 82 and 83 engage the potato and carry it through the knives. It will be understood that when the two members 82 and 83 engage the potato, the member 82 will be rigidly secured to the rod 90, and the member 81 will be disconnected and removed from its normal position in the machine.

Figures 10, 11, 12, 13:
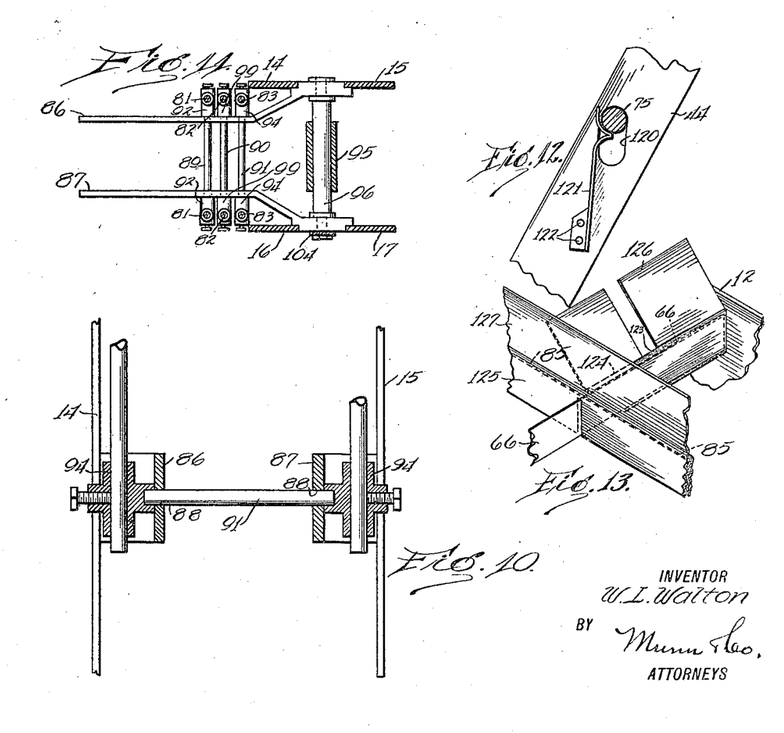
Figure 10 is a section along the line 10—10 of Figure 1.
Figure 11 is a section along the line 11—11 of Figure 1.
Figure 12 is an enlarged view of a portion of the device.
Figure 13 is an enlarged view of another portion of the device.

The pairs of parallel bars will have to be secured to the lever 44 in different relations, when the device is to cut a potato into eight parts, than they were formerly secured when the device cut a potato into twelve equal parts. The cutting knife 85 has to be arranged so as to automatically position itself directly in the center of the potato to be cut. This is accomplished by providing slots in the lever 44 through which the U-shaped members 73 and 75 extend. Figure 12 clearly illustrates this construction. The slot 120 is divided into two circular openings by a leaf spring 121 bent in the manner shown and is secured to the lever 44 at 122. The rod 75 can be moved from one end of the slot to the other by merely forcing the spring away from the slot 120. Moving the members 73 and 75 in this manner causes the knife 84 to always be positioned beneath the plunger-head 40 where it is inoperative, and the knife 85 to be automatically positioned midway between the ends of the potato to be cut.

With the link 43 on the trunnions 116 and 117, a potato can be cut into six equal parts if the knife 59 is moved into inoperative position, and into twelve equal parts if the knife 59 is moved into operative position. In the same manner with the link placed on the trunnions 118 and 119, the potato will be cut into eight parts if the knife 59 is used and into four parts if the knife is not used.

When cutting a potato into halves, I provide a substantially T-shaped member 123 (see Figure 13) which is adapted to be placed over the knife 66 and the knives 85. The member 123 has its sides U-shaped so as to completely cover the knives and has the end of its portion 124 abutting against the bracket 12 while the portion 125 extending transversely to the portion 124 keeps the knife 85 away from the bracket 12 and permits the two halves, cut by the knife 59, to slip between the bracket 12 and the portion 125 and into the conveyor 97.

The portion 124 also has an inclined plate 126 extending from the upper edge thereof, which is adapted to deflect both halves of the potato, cut by the knife 59, into the conveyor 97. A second plate 127 extends upwardly from the portion 125 and acts as a stop for the cut portions of the potato, preventing them from moving thereby and directing them into the conveyor 97.

I claim:

1. A potato cutting machine comprising a frame, means adapted to cut a potato of any size into equal parts, and auxiliary knives movable with respect to the potato for automatically cutting each part into a plurality of equal parts.

2. In a potato cutting machine, a knife, a pair of movable jaws adapted to hold a potato therebetween, means cooperating with said jaws for centering the potato with respect to said knife, and means for moving the potato into engagement with said knife, whereby the potato is cut into two equal parts.

3. In a potato cutting machine, a knife, means for moving said knife into or out of operative position, a pair of movable jaws adapted to hold a potato therebetween, means cooperating with said jaws for centering the potato into engagement with said knife, whereby the potato is cut into two equal parts.

4. In a potato cutting machine, a pair of slidable plates, a jaw rigidly secured to each plate, and equalizing means cooperating with said plates whereby said jaws are always equidistant from a fixed center no matter in what position they are moved.

5. In a potato cutting machine, a plurality of knives, automatic means for positioning said knives with respect to a potato, and means for moving the potato through the knives whereby the former is cut into a plurality of equal parts.

6. In a potato cutting machine, a plurality of knives, automatic means for positioning said knives with respect to a potato, means for cooperating with said automatic means for throwing some of said knives out of cutting position with respect to the potato, and means for moving the potato through the knives, whereby the potato is automatically cut into the desired number of equal parts.

7. In a potato cutting machine, a pair of movable jaws adapted to hold a potato therebetween, means for keeping said jaws equi-distant from a common fixed center, a knife positioned midway between said jaws, means for moving the potato into engagement with said knife, a plurality of knives, automatic means for positioning said knives with respect to the potato, said automatic means adapted to be actuated by the moving potato abutting thereagainst, and means for moving the potato through said knives.

8. In a potato cutting machine, a pair of movable jaws adapted to hold a potato therebetween, means for keeping said jaws equi-distant from a common fixed center, a knife positioned midway between said jaws, means for moving the potato into engagement with said knife, a plurality of knives, automatic means for positioning said knives with respect to the potato, means for throwing some of said knives out of cutting position with respect to the potato, said automatic means adapted to be actuated by the moving potato abutting thereagainst, and means for moving the potato through said knives.

9. In a potato cutting machine, a pair of movable jaws adapted to hold a potato therebetween, means for keeping them equi-distant from a common center, a knife disposed midway between the jaws, means for moving the potato out of engagement with said jaws and into engagement with said knife, and means disposed on each side of the potato and adjacent said jaws and said knife for preventing any lateral movement of the potato.

10. In a potato cutting machine, a horizontally disposed knife, means for positioning a potato so as to be centrally cut by said knife, means for moving the potato into engagement with said knife, means disposed on each side of the potato to prevent any lateral movement of the latter, a plurality of knives, automatic means for positioning said knives with respect to the potato, said means actuated by the potato when the latter is moved, and means for moving the potato through the knives.

11. In a potato cutting machine, a pair of movable jaws adapted to hold a potato therebetween, means for keeping said jaws equi-distant from a common fixed center, a knife positioned midway between said jaws, means for moving said knife into or out of operative position, means for moving the potato into engagement with said knife, a plurality of knives, automatic means for positioning said knives with respect to the potato, said automatic means adapted to be actuated by the moving potato.

12. In a potato cutting machine, a pair of movable jaws adapted to hold a potato therebetween, means for keeping said jaws equi-distant from a common fixed center, a knife positioned midway between said jaws, means for moving said knife into or out of operative position, means for moving the potato into engagement with said knife, a plurality of knives, automatic means for positioning said knives with respect to the potato, means for throwing some of said knives out of cutting position with respect to the potato, said automatic means adapted to be actuated by the moving potato abutting thereagainst, and means for moving the potato through said knives.

13. In a potato cutting machine, a plurality of knives, a plurality of plungers adapted to force a potato through said knives, means for positioning said knives and said plungers with respect to the potato, whereby the potato is cut into a plurality of approximately equal parts when said plungers are actuated.

14. In a potato cutting machine, two pairs of knives, a knife extending at right angles to and disposed between the pairs of said first named knives, a plurality of plungers adapted to force a potato through said knives, means for positioning said pairs of knives and said plungers with respect to the potato, whereby the potato is cut into six approximately equal parts when said plungers are actuated.

15. In a potato cutting machine, two pairs of knives, a knife extending at right angles to and disposed between the pairs of said first named knives, a plurality of plungers adapted to force a potato through said knives, means for placing one pair of said first named knives out of operative position with respect to the potato, means for positioning the other pair of said first named knives with respect to the potato, whereby the potato is cut into four approximately equal parts when said plungers are actuated.

16. In a potato cutting machine, a knife, a pair of jaws adapted to receive a potato therebetween and to center the potato with respect to said knife, two pairs of knives, another knife extending at right angles to and disposed between the pairs of said second named knives, a plurality of plungers adapted to force a potato through said second named knives and said last named knife, means for positioning the pairs of said second named knives and said plungers with respect to the potato, means for moving the potato from between said jaws and through said first named knife, and means for actuating said plungers, whereby the potato is cut into twelve approximately equal parts.

17. In a potato cutting machine, a knife, a pair of jaws adapted to receive a potato therebetween and to center the potato with respect to said knife, two pairs of knives, another knife extending at right angles to and disposed between the pairs of said second named knives, a plurality of plungers adapted to force the potato through said second named knives and said last named knife, means for placing one pair of said second named knives out of operative position with respect to the potato, means for positioning the other pair of said second named knives with respect to the potato, means for moving the potato from between said jaws and through said first named knife, and means for actuating said plungers, whereby the potato is cut into eight approximately equal parts.

18. In a potato cutting machine, a plurality of U-shaped bars adapted to receive a potato therein, a plurality of knives disposed below the potato, and means for actuating said U-shaped bars, whereby the potato will be forced through said knives and cut into a number of parts.

19. In a potato cutting machine, a plurality of U-shaped bars adapted to receive a potato therein, a plurality of knives disposed below the potato, automatic means for positioning said bars with respect to the potato, whereby the potato will be forced downwardly through the knives in a vertical direction when said bars are actuated.

20. In a potato cutting machine, a plurality of U-shaped bars adapted to receive a potato therein, a plurality of knives disposed below the potato, automatic means for positioning said bars and some of said knives with respect to the potato, whereby the potato will be forced downwardly between the knives when the latter are actuated, thus cutting the potato into a plurality of approximately equal parts.

21. In a potato cutting machine, three U-shaped bars adapted to receive a potato therein, a plurality of knives disposed beneath the potato, means for moving said bars downwardly, thus forcing the potato through said knives and cutting it into a plurality of parts, and means for permitting yieldable play between the middle bar of said U-shaped bars and the potato, whereby all three bars will uniformly engage the potato.

22. In a potato cutting machine, a plurality of knives, means for placing a potato over said knives, automatic means for positioning said knives with respect to the potato, and means for forcing the potato through the knives, whereby it will be cut into a plurality of approximately equal parts.

23. In a potato cutting machine, a plurality of knives, means for placing a potato over said knives, automatic means for positioning said knives with respect to the potato, means for throwing some of said knives out of operative position with respect to the potato, and means for forcing the potato through the knives, whereby it will be cut into the desired number of approximately equal parts.

24. In a potato cutting machine, a horizontally disposed knife, a pair of jaws movable in a vertical plane and adapted to receive a potato therebetween and to center the potato with respect to said knife, a second knife disposed beneath said first named knife, and means disposed on each side of said jaws for centering the potato with respect to said second named knife.

25. In a potato cutting machine, a pair of jaws adapted to hold a potato therebetween, a knife disposed below and adjacent one end of the potato, means for moving the potato from between the jaws, and into engagement with said knife, automatic means disposed on each side of the jaws for centering the potato with respect to said knife, and means for forcing said potato through said knife.

26. In a potato cutting machine, a pair of jaws adapted to hold a potato therebetween, a knife disposed below and adjacent one end of the potato, means for moving the potato from between the jaws and into engagement with said knife, a guiding arm disposed on each side of said jaws and adapted to center the potato with respect to said knife, and means for forcing the potato through said knife.

27. In a potato cutting machine, a pair of jaws adapted to hold a potato therebetween, a knife disposed below and adjacent one end of the potato, means for moving the potato from between the jaws and into engagement with said knife, a guiding arm disposed on each side of said jaws and adapted to center the potato with respect to said knife, a plurality of plungers for forcing the potato through said knife, and means for moving said guide arms away from the potato and out of the way of said plungers when the latter are actuated.

28. In a potato cutting machine, a pair of jaws adapted to hold a potato therebetween, a plunger head, a second plunger head adapted to move the potato from between the jaws and into abutting engagement with said first named plunger head, a knife disposed below said plunger head and lying parallel with the longitudinal axis of the potato, and means for centering the potato with respect to said knife, the potato engaging said knife when moved from between said jaws by said second named plunger head.

29. In a potato cutting machine, a pair of plunger heads adapted to grip a potato therebetween, and a knife carried by each plunger head and adapted to engage with the potato.

30. In a potato cutting machine, a pair of plunger heads adapted to grip a potato therebetween, a vertical knife carried by each plunger head and adapted to engage with the potato, a plurality of knives disposed below and to one side of the potato, means for moving the plunger heads above said last named knives, and means for moving the potato from between said plunger heads and into engagement with said last named knives, whereby the potato is prevented from rotating and is guided downwardly in a vertical plane by said vertical knives.

31. In a potato cutting machine, a frame having a guide-way therein, a pair of slidable plates disposed in said guide-way, a jaw rigidly secured to each plate, an equalizing lever pivotally carried by said frame, and links operatively connecting said plates with said lever, whereby said jaws are always equi-distant from a fixed center.

32. In a potato cutting machine, a frame, a pair of slidable plates, a jaw rigidly secured to each plate, an equalizing lever pivotally carried by said frame, links operatively connecting said plates with said lever, whereby said jaws are always equi-distant from a fixed center, and means for preventing said jaws from engaging one another.

33. In a potato cutting machine, a frame, a pair of slidable plates, a jaw rigidly secured to each plate, an equalizing lever pivotally carried by said frame, links operatively connecting said plates with said lever, whereby said jaws are always equi-distant from a fixed center, and means for preventing said jaws from engaging one another, said means comprising a second lever carried by said frame, a link operatively connecting said second named lever with said first named lever, and a stop pin for determining the movement of said jaws.

34. In a potato cutting machine, a pair of vertically movable jaws adapted to automatically center a potato with respect to a fixed horizontal line, and guide arms adapted to move in a horizontal plane and to center the potato with respect to the aforesaid horizontal line.

35. In a potato cutting machine, a pair of potato guiding arms adapted to move in a horizontal plane, and means co-operating with said guides for keeping said guides equi-distant from a fixed center during the entire movement of said guides.

36. In a potato cutting machine, a pair of potato guiding arms adapted to move in a horizontal plane, means cooperating with said guides for keeping said guides equi-distant from a fixed center during the entire movement of said guides, and yielding means for moving said guides toward each other.

37. In a potato cutting machine, three U-shaped bars, means for moving a potato within said bars, means actuated by the potato for positioning the bars so that the bars are disposed over the center and adjacent to the ends of the potato, and means for moving said bars downwardly.

38. In a potato cutting machine, a pair of knives, means for automatically positioning said knives with respect to a potato, whereby the potato will be cut into thirds when it is forced through said knives, and means for putting one of said knives out of operative position, said last named means being adapted to center the other knife with respect to the potato.

39. In a potato cutting machine, a stationary knife adapted to have a potato centered thereabove, a pair of knives extending at right angles to said first named knife and being disposed on each side thereof, said knives always being kept in alinement with each other, and means for automatically centering said last named knives with respect to the potato, whereby the potato will be cut into four equal parts when it is forced through the knives.

40. In a potato cutting machine, a stationary knife adapted to have a potato centered thereabove, two sets of movable knives extending at right angles with respect to said first named knife, each set consisting of two alined knives, one knife being disposed on each side of said stationary knife, and automatic means for positioning said movable knives with respect to the potato, whereby the potato will be cut into six equal parts when it is forced through the knives.

41. In a potato cutting machine, a stationary knife adapted to have a potato centered thereabove, two sets of movable knives extending at right angles with respect to said first named knife, each set consisting of two alined knives, one knife being disposed on each side of said stationary knife, automatic means for positioning said movable knives with respect to the potato, whereby the potato will be cut into six equal parts when it is forced through the knives, and means for putting one set of knives out of operative position, said last named means being adapted to center the other set of knives with respect to the potato.

42. In a potato cutting machine, a plurality of U-shaped bars adapted to move a potato downwardly, potato engaging members carried by said bars, said members being spaced from the sides of said bars, potato guiding arms extending into said U-shaped members and being adapted to automatically center a potato with respect to said bars, said arms being adapted to move in a horizontal plane, and means for swinging said arms outwardly when said U-shaped bars are moved downwardly, whereby said arms will not abut said members.

43. A potato cutting machine comprising a frame, means adapted to cut a potato of any size into equal parts, and auxiliary knives movable with respect to the potato for automatically cutting each part into a plurality of equal parts, said auxiliary means being movable into operative or inoperative position.

44. A potato cutting machine comprising a frame, means adapted to receive and to cut a potato of any size into equal parts and auxiliary knives automatically moved with respect to the potato for cutting each part into a plurality of equal parts.

WILLIAM L. WALTON.